(12) United States Patent
Norman

(10) Patent No.: US 6,851,749 B2
(45) Date of Patent: Feb. 8, 2005

(54) MULTI-FUNCTION SHOPPING CART INSERT

(75) Inventor: Lisa C. Norman, Solana Beach, CA (US)

(73) Assignee: Infantino, LLC, San Diego, CA (US)

( * ) Notice: Subject to any disclaimer, the term of this patent is extended or adjusted under 35 U.S.C. 154(b) by 0 days.

(21) Appl. No.: 10/137,849

(22) Filed: May 2, 2002

(65) Prior Publication Data
US 2003/0205922 A1 Nov. 6, 2003

(51) Int. Cl.⁷ ................................. A47C 1/08
(52) U.S. Cl. .................. 297/256.17; 297/256.16; 297/229; 297/228; 297/219.12
(58) Field of Search ............... 297/256.17, 256.13, 297/153, 219.1, 219.12, 218.1, 218.2

(56) References Cited

U.S. PATENT DOCUMENTS

| | | |
|---|---|---|
| 2,141,881 A | 12/1938 | Schray |
| 2,220,150 A | 11/1940 | Goldman |
| 2,508,670 A | 5/1950 | Goldman |
| 2,797,743 A * | 7/1957 | Rodtz, Jr. .................. 297/229 |
| 3,311,934 A | 4/1967 | Goldberg |
| 3,336,608 A | 8/1967 | Lerner |
| 3,436,770 A | 4/1969 | Turner |
| 3,578,380 A | 5/1971 | Jacobus |
| 3,866,649 A | 2/1975 | Bringmann |
| 3,909,034 A | 9/1975 | Trubiano |
| 3,993,319 A | 11/1976 | Day |
| D289,123 S | 4/1987 | Tennen |
| 4,655,502 A | 4/1987 | Houllis |
| D296,730 S | 7/1988 | Fetterman |
| 4,805,937 A | 2/1989 | Boucher et al. |
| 5,238,293 A * | 8/1993 | Gibson ................... 297/229 |
| 5,678,888 A * | 10/1997 | Sowell et al. .......... 297/256.17 |
| 5,967,606 A | 10/1999 | Bergh et al. |
| 6,065,655 A | 5/2000 | Parewick |
| 6,129,418 A * | 10/2000 | Bergh et al. .......... 297/256.17 |
| 6,224,152 B1 | 5/2001 | Hughes et al. |
| 6,237,998 B1 * | 5/2001 | Aprile ................. 297/219.12 |
| 6,428,098 B1 * | 8/2002 | Allbaugh ............. 297/219.12 |

* cited by examiner

Primary Examiner—Peter M. Cuomo
Assistant Examiner—Erika Garrett
(74) Attorney, Agent, or Firm—Stetina Brunda Garred & Brucker

(57) ABSTRACT

A multi-function insert adapted for use as a play mat and as a seat cover for a shopping cart which includes a handlebar and a seat having a seat bottom, a backrest, and a pair of leg openings. The insert comprises a panel which defines opposed front and back surfaces. Disposed within the panel are at least two flaps which are selectively movable between open and closed positions. Attached to the panel is a fastening mechanism which is configured to selectively maintain a portion of the panel in releasable engagement to the handlebar of the shopping cart when the insert is used as a seat cover. The panel is sized and configured such that when releasably engaged to the handlebar, extended along and over the seat bottom, and draped over the backrest, the flaps will be substantially aligned with respective ones of the leg openings of the shopping cart.

10 Claims, 2 Drawing Sheets

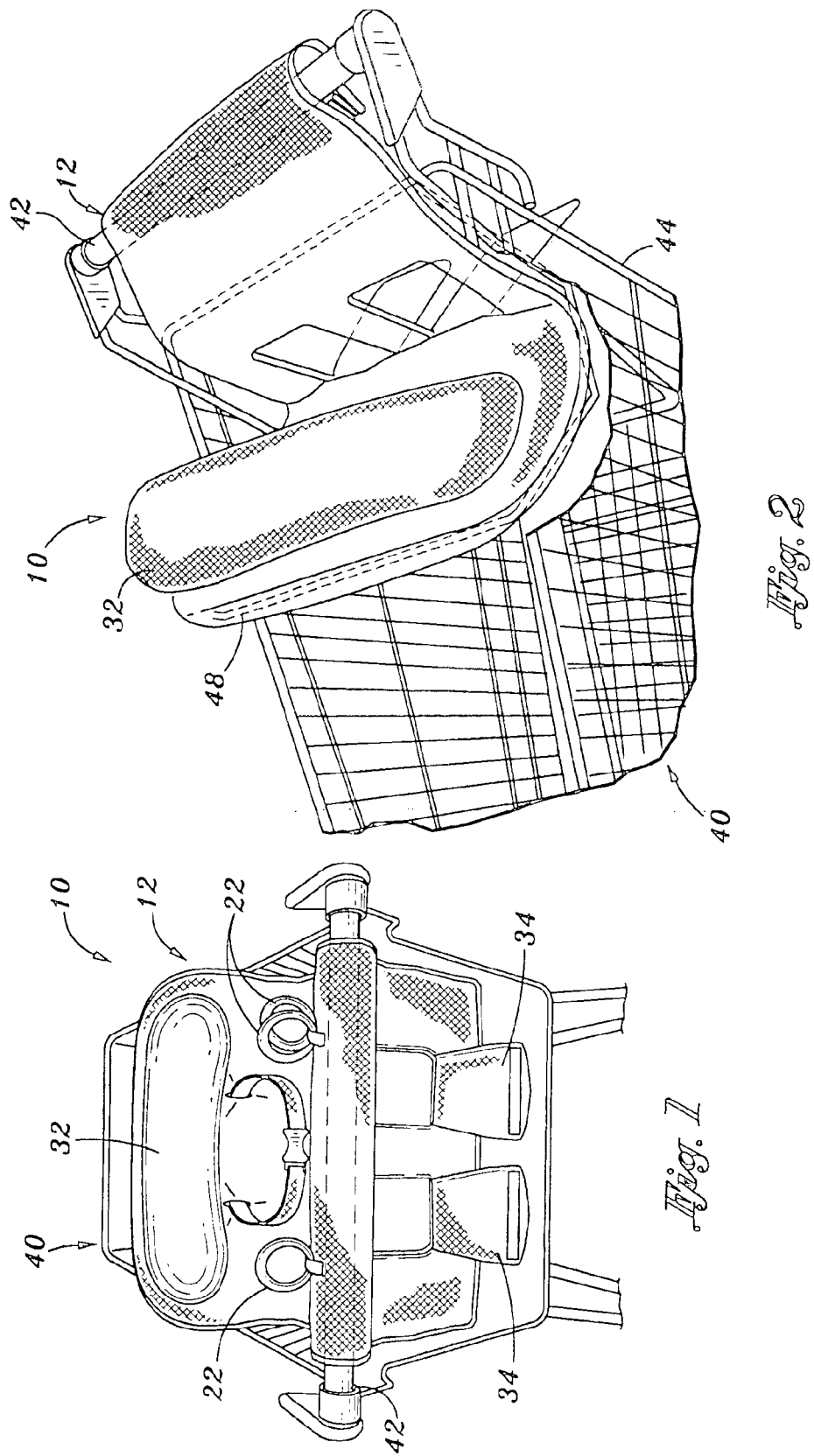

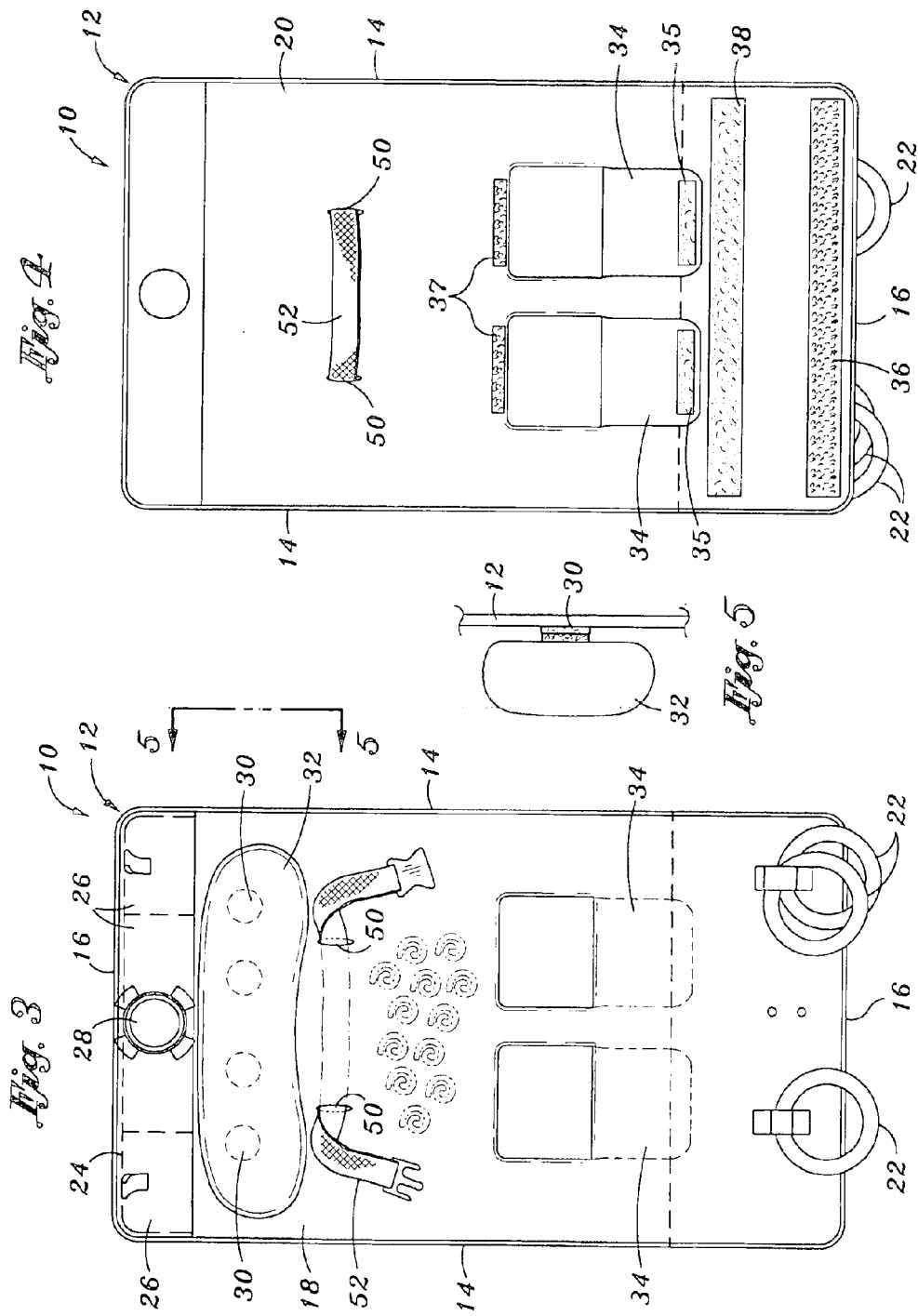

MULTI-FUNCTION SHOPPING CART INSERT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to infant products, and more particularly to a shopping cart seat insert for an infant or toddler which may be quickly and easily converted or reconfigured into a play mat.

As is well known to parents, conventional shopping carts or buggies are typically equipped with a seat for accommodating an infant or toddler. The seat is typically located adjacent the handlebar used to push the shopping cart and oriented such that the infant or toddler placed within the seat faces the adult pushing the shopping cart. The shopping cart is outfitted with a plastic flap which may be extended along the seat bottom to provide a firm, smooth surface for the buttocks of the infant within the seat, with the shopping cart further being configured to define a pair of openings adjacent such plastic flap to accommodate respective ones of the infant's or toddler's legs.

Though the seat of the shopping cart is provided with the above-described plastic flap, the majority of the seat is defined by the structural rods or members used to form the shopping cart. In this regard, that portion of the shopping cart defining the backrest of the seat typically consists of the steel bars alone, thus being extremely uncomfortable for the infant or toddler leaning against the back of the seat.

In recognition of the configuration of the seats within most shopping carts, there has been developed in the prior art various shopping cart seat covers which are adapted to be placed within the seat of a shopping cart to function as a cushioning liner which makes the seat substantially more comfortable for the infant or toddler placed therein. Though these shopping cart seat covers provide an increased comfort level for the infant, they possess little if any utility outside the specific use thereof within the shopping cart seat.

Another item known to most parents and popular with infants and toddlers is referred to as an activity mat or play mat. Typically, play mats are provided with various activity items which may be manipulated or handled by the infant when the play mat is stretched out over the floor and the infant placed thereon. Most of the activity items may be manipulated by the infant with the infant sitting down or lying on its stomach, with the play mat further being sized and cushioned so as to serve as a surface upon which the infant or toddler can nap.

In the interests of economy, the present invention provides a uniquely configured shopping cart seat cover or insert which may be interfaced to a shopping cart in a traditional manner, and is specifically adapted to be reconfigured into a play mat for an infant or toddler. The present invention provides the attributes of both a shopping cart seat cover and a play mat within a single product, thus providing a product which is more economical as compared to most currently known shopping cart seat covers and play mats which are capable of performing only a single function. These, and other advantages of the present invention, will be discussed in more detail below.

BRIEF SUMMARY OF THE INVENTION

In accordance with the present invention, there is provided a multi-function insert which is adapted for use as either a seat cover for a shopping cart or as a play mat placeable upon a floor. The shopping cart with which the insert may be used includes a handlebar and a seat having a back rest, a seat bottom, and a pair of leg openings. The insert of the present invention comprises an elongate, rectangularly configured panel defining opposed front and back surfaces. Disposed within the panel are two flaps which are selectively moveable between open and closed positions. Each of the flaps is maintained in its closed position via the releasable engagement of a patch or strip of hook-and-loop fastener material attached thereto to a corresponding strip of hook-and-loop fastener material attached to the back surface of the panel. Attached to the back surface of the panel is a fastening mechanism which itself preferably comprises a spaced pair of strips of hook-and-loop fastener material which are adapted to selectively maintain a portion of the panel in releasable engagement to the handlebar of the shopping cart when the insert is employed as the seat cover. The panel is sized and configured such that when releasably engaged to the handlebar, extended over the seat bottom of the shopping cart seat, and draped over the back rest thereof, the flaps will be substantially aligned with respective ones of the shopping cart leg openings, thus allowing the legs of an infant or toddler to be extended therethrough when folded outwardly to the open positions.

The panel of the insert of the present invention is preferably rectangularly configured, defining opposed pairs of longitudinal and lateral peripheral edge segments. One of the lateral edge segments is wrapped about the handlebar when the insert is employed as the seat cover, with the remaining lateral peripheral edge segment being draped over the backrest of the shopping cart. An elongate seat belt is cooperatively engaged to the panel, and is sized to be extensible about at least a portion of the backrest when the insert is used as the seat cover. The panel itself is preferably fabricated from at least two layers of fabric material having a layer of padding or cushioning material therebetween. The fabric layers each preferably include decorative indicia.

In the insert of the present invention, activity items may be attached to the front surface of the panel at locations whereat at least some of the activity items may be easily grasped or manipulated by an infant or toddler when the insert is used as the seat cover. A sheet of material may also be attached to the front surface of the panel in a manner defining at least one pocket having an upwardly directed or presented open end when the panel is draped over the backrest of the shopping cart. Further, a pillow may be releasably attached to the front surface of the panel to provide support to an infant or toddler when the insert is used as either the seat cover for the shopping cart or as the play mat.

BRIEF DESCRIPTION OF THE DRAWINGS

These, as well as other features of the present invention, will become more apparent upon reference to the drawings wherein:

FIG. 1 is a front elevational view of the insert of the present invention when employed as a shopping cart seat cover;

FIG. 2 is a top perspective view of the insert of the present invention when employed as a shopping cart seat cover;

FIG. 3 is a front elevational view of the insert of the present invention when extended for use as a play mat;

FIG. 4 is a rear elevational view of the insert of the present invention as shown in FIG. 3; and FIG. 5 is a cross-sectional view taken along line 5—5 of FIG. 3.

DETAILED DESCRIPTION OF THE INVENTION

Referring now to the drawings wherein the showings are for purposes of illustrating a preferred embodiment of the present invention only, and not for purposes of limiting the same, FIGS. 1–5 illustrate a shopping cart seat cover or insert 10 of the present invention which, as will be described in more detail below, may be selectably reconfigured into a play mat. The insert 10 comprises a panel 12 which has a generally rectangular configuration defining an opposed pair of longitudinal peripheral edge segments 14, and an opposed pair of lateral peripheral edge segments 16. A portion of each of the longitudinal peripheral edge segments 14 adjacent one of the lateral peripheral edge segments 16 is laterally offset inwardly relative to the remainder thereof, thus resulting in the lateral peripheral edge segment 16 adjacent such laterally offset portions being of a shorter length than the remaining lateral peripheral edge segment 16. However, those of ordinary skill in the art will recognize that the longitudinal peripheral edge segments 14 need not necessarily include the laterally offset portions, with the lateral peripheral edge segments 16 being of substantially equal length. The panel 12 further defines a front surface 18 and an opposed back surface 20. The panel 12 is preferably fabricated from two layers of fabric material, having a cushioning material therebetween so as to impart to the panel 12 a requisite level of plushness and softness. The fabric layers used to fabricate the panel 12 each preferably include decorative indicia.

Attached to the front surface 18 of the panel 12 adjacent the lateral peripheral edge segment 16 of shorter length are activity items 22 which may be handled or manipulated by an infant or toddler in a manner which will be described in more detail below. As shown in FIG. 3, these activity items 22 comprise play rings, though those of ordinary skill in the art will recognize that structures other than for rings may be included as the activity items 22. Also attached to the front surface 18 of the panel 12 adjacent the lateral peripheral edge segment 16 of greater length is a rectangularly configured sheet 24 of fabric material. As seen in FIG. 3, the sheet 24 is attached to the panel 12 via stitching in a manner wherein at least one, and preferably three, pockets 26 are defined between the sheet 24 and the front surface 18 of the panel 12. The entrances to the pockets 26 are defined by the longitudinal edge of the sheet 24 disposed furthest from the lateral peripheral edge segment 16 of the panel 12 of greater length. It is contemplated that the portion of the sheet 24 defining the center one of the three pockets 26 will have a mirror 28 attached to the outer surface thereof. However, those of ordinary skill in the art will recognize that an activity item other than for the mirror 28 may be attached to the central pocket 26, and that a mirror or any activity item may be attached to any one or any combination of the pockets 26.

Also attached to the front surface 18 of the panel 12 in close proximity to the sheet 24 are multiple patches 30 of hook-and-loop fastener material. The patches 30 are used to facilitate the releasable attachment of an arcuately contoured pillow 32 to the front surface 18 of the panel 12. The use of the pillow 32 will also be described in more detail below.

Formed within the panel 12, between the patches 30 and the activity items 22, is a spaced pair of openable and closable flaps 34. The flaps 34 each have a generally square configuration, and are attached to the remainder of the panel 12 along one of the four peripheral edge segments thereof. The movement or folding of the flaps 34 to their open positions facilitates the formation of a spaced pair of generally square openings within the panel 12. Each of the flaps 34 may be maintained in a closed position through the engagement of a patch or strip 35 of hook-and-loop fastener material thereon to a corresponding patch or strip 37 of hook-and-loop fastener material disposed on the back surface 20 of the panel 12. As will be recognized, the separation of such corresponding patches or strips 35, 37 of hook-and-loop fastener material from each other allows the flaps 34 to be opened, thus facilitating the formation of the openings within the panel 12. Disposed within the panel 12 between the flaps 34 and the patches 30 is a spaced pair of slots 50. The slots 50 are used to accommodate an elongate strap or belt 52 in a manner which will be described in more detail below.

Attached to the back surface 20 of the panel 12 along the lateral peripheral edge segment 16 of shorter length is at least one strip 36 of hook-and-loop fastener material. At least one additional strip 38 of hook-and-loop fastener material is attached to the back surface 20 of the panel 12 between the strip 36 and the flaps 34. The use of the strips 36, 38 will also be described below.

As indicated above, the insert 10 may be used as a seat cover or liner for a shopping cart seat. As seen in FIGS. 1 and 2, a typical shopping cart 40 includes a handlebar 42 which is grasped by the user and used to push the shopping cart 40. The structural members used to form the back wall 44 of the shopping cart 40 which extends below the handlebar 42 are assembled to define a pair of leg openings. The shopping cart 40 is also provided with a collapsible wall 48 which, when actuated toward the front of the shopping cart 40 (i.e., away from the handlebar 42) defines the seat bottom and backrest of the seat of the shopping cart 40. The leg openings defined by the back wall 44 are disposed adjacent to and above the seat bottom defined by the deployment of the collapsible wall 48.

The insert 10 is used as a seat cover by placing the panel 12 within the seat of the shopping cart 40 such that the back surface 20 of the panel 12 directly engages the shopping cart 40. The lateral peripheral edge segment 16 of greater length is draped over the top edge of the deployed collapsible wall 48, with the panel 12 being sized such that the draping causes the open ends of the pockets 26 to be upwardly directed or presented, thus allowing for the placement of objects such as pacifiers, baby bottles, or keys thereinto for temporary storage during use of the shopping cart 40. The lateral peripheral edge segment 16 of the panel 12 of shorter length is itself wrapped about the handlebar 42, with the strips 36, 38 being releasably attached to each other so as to secure the panel 12 to the handlebar 42.

In addition to the panel 12 being secured to the handlebar 42 in the above-described manner, the belt 52 is advanced through one of the slots 50, about one or more of the structural members of the collapsible wall 48 defining the backrest of the infant/toddler seat, and back through the remaining slot 50. When the panel 12 is draped over the top edge of the collapsible wall 48 and secured to the handlebar 42, the sizing of the panel 12 causes the flaps 34 to be generally aligned with respective ones of the leg openings defined within the back wall 44 of the shopping cart 40. Thus, with the panel 12 being positioned within the infant/ toddler seat of the shopping cart 40 in the above-described manner, the flaps 34 may be opened outwardly, thus causing the resultant openings formed within the panel 12 to be in substantial alignment with respective ones of the leg openings. The infant or toddler may then be positioned upon the insert 10 within the infant/toddler seat, with the legs of the toddler being extended through respective ones of the leg openings via the openings defined by the outward folding of the flaps 34.

The extension of the panel 12 along the seat bottom and backrest of the infant/toddler seat provides a substantially increased comfort level for the infant or toddler therein. Further support may be provided to the back of the infant or toddler by releasably attaching the pillow 32 to the patches 30. Advantageously, the activity items 22 extend along the handlebar 42 of the shopping cart 40 which is partially wrapped by the panel 12, and thus are presented for play or manipulation by the infant or toddler within the shopping cart seat. It is contemplated that once the infant or toddler is placed upon the insert 10 within the shopping cart seat, the belt 52 will be extended about and secured to the waist of the infant or toddler. Thus, the belt 52 will be extended about the infant's waist in addition to being extended about a portion of the collapsible wall 48 defining the backrest, therefore preventing the infant from rocking or leaning forward excessively away from the backrest.

When the insert 10 is removed from within the shopping cart seat, the belt 52 may be removed from within the slots 50, with the flaps 34 being returned to their closed positions. The back surface 20 of the panel 12 may then be placed against the floor, with the front surface 18 thus being exposed. The infant or toddler may then be placed upon the exposed front surface 18 of the panel 12, with the same being used as a play mat, and the mirror 28 and activity items 22 being presented for manipulation and play by the infant or toddler. When the insert 10 is used as a play mat, the pillow 32 may also be releasably attached to the patches 30 to be used as a prop-up pillow for "tummy time" when the infant or toddler lays on the panel 12. As indicated above, the pillow 32 may be used to provide back support/increased comfort to the infant or toddler when the insert 10 is used as a shopping cart seat cover. When the panel 12 is folded up and not used as either a shopping cart seat cover or play mat, the belt 52 may be used as a handle for carrying the same.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A multi-function insert adapted for use as a play mat and as a seat cover for a shopping cart which includes a handlebar and a seat having a seat bottom, a backrest, and a pair of leg openings, the insert comprising:

an elongate panel defining opposed front and back surface, wherein the panel is rectangularly configured defining opposed pairs of parallel longitudinal and lateral peripheral edge segments;

at least two flaps disposed within the panel and selectively movable between open and closed positions; and a plurality of fastening mechanisms attached to the panel and configured to selectively maintain a portion of the panel in releasable engagement to the handlebar of the shopping cart and to selectively maintain the flaps in releasable engagement to the panel;

the panel being sized and configured to be selectively foldable and unfoldable between respective non-planar and planar configurations, the non-planar configuration of the panel being such that when the panel is releaseably engaged to the handlebar, extended over the seat bottom and draped over the back rest, the flaps will be substantially aligned with respective ones of the leg openings when the flaps are moved to the open position, the planar configuration of the panel being such that the front and back surfaces assume a flat configuration with the flaps being releaseably engagable to the panel in the closed position when the insert is unfolded for use as a play mat.

2. The insert of claim 1 wherein:
   one of the lateral peripheral edge segments being wrapped about the handlebar with the remaining one of the lateral peripheral edge segments being draped over the backrest when the insert is employed as the seat cover.

3. The insert of claim 1 wherein the plurality of the fastening mechanisms comprises:
   at least two strips of hook-and-loop fastener material attached to the back surface of the panel in spaced relation to each other for maintaining the portion of the panel in releasable engagement to the handlebar; and
   a strip of hook-and-loop fastener material disposed on each one of the flaps and being releaseably engageable to a corresponding strip of hook-and-loop fastener material disposed on the back surface of the panel for maintaining the flaps in the closed position.

4. The insert of claim 1 wherein the panel is fabricated from at least two layers of fabric material having a layer of padding therebetween.

5. The insert of claim 4 wherein each of the layers of fabric material has decorative indicia thereon.

6. The insert of claim 1 further comprising an elongate seat belt releaseably engageable to the panel and selectively extensible about the backrest of the shopping cart when the insert is used as the seat cover for the seat thereof.

7. The insert of claim 1 further comprising a pillow releaseably attachable to the front surface of the panel.

8. The insert of claim 1 further comprising a sheet of material attached to the front surface of the panel in a manner defining at least one pocket.

9. The insert of claim 1 further comprising at least one activity item attached to the front surface of the panel.

10. A multi-function insert adapted for use as a play mat and as a seat cover for a shopping cart which includes a handlebar and a seat having a seat bottom, a backrest, and a pair of leg openings, the insert comprising:

an elongate panel defining opposed front and back surfaces, wherein the panel is rectangularly configured defining opposed pairs of parallel longitudinal and lateral peripheral edge segments, the panel being fabricated from at least two layers of fabric material with a layer of padding being interposed therebetween, each of the layers of fabric having decorative indicia thereon, one of the lateral peripheral edge segments being wrapped about the handlebar with the remaining one of the lateral peripheral edge segments being draped over the backrest when the insert is employed as the seat cover, the back surface of the panel including at least two strips of hook-and-loop fastener material being attached thereto in spaced relation to each other for maintaining the lateral peripheral edge segments of the panel in releasable engagement to the handlebar;

at least two flaps disposed within the panel adjacent the leg openings and being selectively movable between open and closed positions, each one of the flaps having a strip of hook-and-loop fastener material disposed thereon and being releaseably engageable to a corresponding strip of hook-and-loop fastener material disposed on the back surface of the panel for selectively maintaining the flaps in the closed position;

at least one activity item attached to the front surface of the panel adjacent to the one of the lateral peripheral edge segments that is wrapped about the handlebar; and an elongate seat belt being releaseably engageable to the panel adjacent to the seat belt and being selectively extensible about the backrest of the shopping cart when the insert is used as the seat cover for the seat thereof;

wherein the panel is sized and configured to be selectively foldable and unfoldable between respective non-planar and planar configurations, the non-planar configuration of the panel being such that when the panel is releaseably engaged to the handlebar, extended over the seat bottom and draped over the back rest, the flaps will be substantially aligned with respective ones of the leg openings when the flaps are moved to the open position, the planar configuration of the panel being such that the front and back surfaces assume a flat configuration with the hook-and-loop fastener material maintaining the flaps in the closed position when the insert is unfolded for use as a play mat.

* * * * *